US010028150B2

(12) United States Patent
Dai et al.

(10) Patent No.: US 10,028,150 B2
(45) Date of Patent: Jul. 17, 2018

(54) METHOD AND SYSTEM FOR CONTENDING FOR CHANNEL OF UNLICENSED FREQUENCY BAND, AND APPARATUS

(71) Applicant: HUAWEI TECHNOLOGIES CO., LTD., Shenzhen (CN)

(72) Inventors: Mingzeng Dai, Shanghai (CN); Qinghai Zeng, Shanghai (CN); Jian Zhang, Shanghai (CN); Hongping Zhang, Shanghai (CN); Yi Guo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 15/219,940

(22) Filed: Jul. 26, 2016

(65) Prior Publication Data

US 2016/0337869 A1 Nov. 17, 2016

Related U.S. Application Data

(63) Continuation of application No. PCT/CN2014/071495, filed on Jan. 26, 2014.

(51) Int. Cl.
| | |
|---|---|
| *H04L 5/12* | (2006.01) |
| *H04W 16/14* | (2009.01) |
| *H04W 16/10* | (2009.01) |
| *H04W 74/08* | (2009.01) |
| *H04W 74/00* | (2009.01) |
| *H04W 88/02* | (2009.01) |

(52) U.S. Cl.
CPC ......... *H04W 16/14* (2013.01); *H04W 16/10* (2013.01); *H04W 74/085* (2013.01); *H04W 74/006* (2013.01); *H04W 88/02* (2013.01)

(58) Field of Classification Search
CPC ............................. H04L 12/26; H04W 76/048
(Continued)

(56) References Cited

U.S. PATENT DOCUMENTS

| 8,830,917 | B1* | 9/2014 | Zhang | H04W 4/00 370/329 |
| 2010/0265925 | A1* | 10/2010 | Liu | H04B 7/0617 370/336 |

(Continued)

FOREIGN PATENT DOCUMENTS

| CN | 101034932 A | 9/2007 |
| CN | 101102143 A | 1/2008 |

(Continued)

OTHER PUBLICATIONS

International Search Report and Written Opinion dated Oct. 27, 2014 in corresponding International Patent Application No. PCT/CN2014/071495.

(Continued)

*Primary Examiner* — Iqbal Zaidi
(74) *Attorney, Agent, or Firm* — Staas & Halsey LLP

(57) ABSTRACT

Embodiments of the present invention provide a method and system for contending for a channel of an unlicensed frequency band, and an apparatus. The method for contending for a channel of an unlicensed frequency band in the present invention includes: acquiring, according to contention timeslot configuration information, a condition for starting a contention timeslot, and starting the contention timeslot when the condition is met, where the contention timeslot configuration information includes at least one of the following configurations: a time configuration of the contention timeslot, a contention backoff time, a terminal feedback uplink configuration, or a channel available condition; and performing a corresponding operation within the contention timeslot according to the time configuration of the contention timeslot to contend for a channel of an unlicensed frequency band, so as to implement data transmission on the unlicensed frequency band.

4 Claims, 8 Drawing Sheets

(58) Field of Classification Search
USPC .................................................. 370/235–339
See application file for complete search history.

(56) References Cited

U.S. PATENT DOCUMENTS

| | | | |
|---|---|---|---|
| 2013/0237264 A1 | 9/2013 | Kasslin et al. | |
| 2014/0376433 A1 | 12/2014 | Li et al. | |
| 2014/0378157 A1* | 12/2014 | Wei | H04W 16/14 455/454 |

FOREIGN PATENT DOCUMENTS

| | | |
|---|---|---|
| CN | 103096440 A | 5/2013 |
| CN | 103313253 A | 9/2013 |
| WO | 03/039054 A2 | 5/2003 |

OTHER PUBLICATIONS

Extended European Search Report dated Jan. 31, 2017 in corresponding European Patent Application No. 14879894.5.
Ryu et al., "MobiCom Poster Abstract: S-EDCA: EDCA based on SuperSlot and Pseudo Collision", Mobile Computing and Communications Review, vol. 10, No. 4, Brain Korean 21 project of Ministry of Education, 2005, pp. 15-16.
"Further analysis on in-device coexistence interference avoidance solutions", 3GPP TSG-RAN WG2 Meeting #71bis, ZTE, R2-105361, Oct. 11-15, 2010, Xi'an, China, pp. 1-8.
International Search Report dated Oct. 27, 2014 in corresponding International Application No. PCT/CN2014/071495.

* cited by examiner

METHOD AND SYSTEM FOR CONTENDING FOR CHANNEL OF UNLICENSED FREQUENCY BAND, AND APPARATUS

CROSS-REFERENCE TO RELATED APPLICATIONS

This application is a continuation of International Application No. PCT/CN2014/071495, filed on Jan. 26, 2014, which is hereby incorporated by reference in its entirety.

TECHNICAL FIELD

Embodiments of the present invention relate to communications technologies, and in particular, to a method and system for contending for a channel of an unlicensed frequency band, and an apparatus.

BACKGROUND

With rapid development of packet services and intelligent terminals, a high-speed service with a large data volume has an increasing requirement for spectrums. To meet a requirement that a downlink peak speed of a Long Term Evolution (Long Term Evolution, LTE for short) system of the 3rd Generation Partnership Project (The 3rd Generation Partnership Project, 3GPP for short) is 1000 Mbit/s, and an uplink peak speed is 500 Mbit/s, a maximum 100-megahertz transmission bandwidth needs to be provided. Because continuous spectrum resources of such a large bandwidth are scarce, a carrier aggregation (Carrier Aggregation, CA for short) solution is proposed. However, spectrum resources of a licensed frequency band of the LTE are limited, and according to the latest released Federal Communications Commission (Federal Communications Commission, FCC for short) international spectrum white paper, unlicensed spectrum (unlicensed spectrum) resources are more than licensed spectrum resources. Therefore, if the LTE is applied to an unlicensed frequency band, the unlicensed spectrum resources may be used more effectively, increasing an available spectrum bandwidth of an LTE user.

At present, there are many users sharing the unlicensed frequency band. These users may belong to different radio access technologies (Radio Access Technology, RAT for short), such as wireless fidelity (Wireless Fidelity, WiFi for short), Bluetooth (Bluetooth), and Zigbee (Zigbee). If the LTE uses the unlicensed frequency band in a carrier aggregation technology, the LTE needs to contend with another RAT user by using an appropriate channel contention mechanism, so as to reduce mutual interference, and fairly and properly use the unlicensed spectrum resources.

SUMMARY

Embodiments of the present invention provide a method and system for contending for a channel of an unlicensed frequency band, and an apparatus, so as to implement data transmission in an LTE carrier aggregation technology by using the unlicensed frequency band, so that an LTE user and another RAT user fairly and properly use unlicensed spectrum resources, and a mutual interference problem is resolved.

According to a first aspect, an embodiment of the present invention provides a method for contending for a channel of an unlicensed frequency band, including:

acquiring, according to contention timeslot configuration information, a condition for starting a contention timeslot, and starting the contention timeslot when the condition is met, where the contention timeslot configuration information includes at least one of the following configurations: a time configuration of the contention timeslot, a contention backoff time, a terminal feedback uplink configuration, or a channel available condition; and performing a corresponding operation within the contention timeslot according to the time configuration of the contention timeslot to contend for a channel of an unlicensed frequency band, so as to implement data transmission on the unlicensed frequency band, where the time configuration of the contention timeslot includes an idle time length, a channel listening time length, or a channel preemption time length.

With reference to the first aspect, in a first possible implementation manner of the first aspect, the method is executed by a second network device, the performing a corresponding operation within the contention timeslot according to the time configuration of the contention timeslot to contend for a channel of an unlicensed frequency band includes:

remaining, beginning from a moment of starting the contention timeslot, an idle state within the idle time length, then listening to a status of the channel of the unlicensed frequency band within the channel listening time length, determining, according to the channel available condition, whether the channel of the unlicensed frequency band is available, and sending a first channel contention frame if the channel of the unlicensed frequency band is available, where the first channel contention frame carries the channel preemption time length.

With reference to the first possible implementation manner of the first aspect, in a second possible implementation manner of the first aspect, the contention timeslot configuration information further includes: a starting period and subframe offset that are of the contention timeslot; and the acquiring, according to contention timeslot configuration information, a condition for starting a contention timeslot, and starting the contention timeslot when the condition is met includes:

computing and acquiring, according to the starting period and the subframe offset that are of the contention timeslot, the moment of starting the contention timeslot, and starting the contention timeslot at the moment.

With reference to the first possible implementation manner of the first aspect, in a third possible implementation manner of the first aspect, the contention timeslot configuration information further includes: a starting trigger condition of the contention timeslot; and the acquiring, according to contention timeslot configuration information, a condition for starting a contention timeslot, and starting the contention timeslot when the condition is met includes:

monitoring an uplink channel and/or a downlink channel according to the starting trigger condition of the contention timeslot, and starting the contention timeslot when an event meeting the starting trigger condition is generated.

With reference to any one of the first to the third possible implementation manners of the first aspect, in a fourth possible implementation manner of the first aspect, after the performing a corresponding operation within the contention timeslot according to the time configuration of the contention timeslot to contend for a channel of an unlicensed frequency band, the method further includes:

notifying a terminal of a channel contention result.

With reference to any one of the first to the fourth possible implementation manners of the first aspect, in a fifth possible implementation manner of the first aspect, after the performing a corresponding operation within the contention timeslot according to the time configuration of the contention timeslot to contend for a channel of an unlicensed frequency band, the method further includes:

if contention for the channel of the unlicensed frequency band fails, withdrawing, according to the contention backoff time, from the contention for the channel until the contention backoff time expires, and re-listening to the status of the channel of the unlicensed frequency band within the channel listening time length.

With reference to the first aspect, in a sixth possible implementation manner of the first aspect, the method is executed by a terminal, the performing a corresponding operation within the contention timeslot according to the time configuration of the contention timeslot to contend for a channel of an unlicensed frequency band includes:

remaining, beginning from a moment of starting the contention timeslot, an idle state within the idle time length, then within the channel listening time length, monitoring a first channel contention frame sent by a second network device and/or listening to a status of the channel of the unlicensed frequency band, and sending a second channel contention frame if the first channel contention frame is received and/or the channel of the unlicensed frequency band is available, where the second channel contention frame carries the channel preemption time length.

With reference to the sixth possible implementation manner of the first aspect, in a seventh possible implementation manner of the first aspect, the contention timeslot configuration information further includes: a starting period and subframe offset that are of the contention timeslot, and a sequence in which the terminal preempts the channel; and the acquiring, according to the contention timeslot configuration information, a condition for starting a contention timeslot, and starting the contention timeslot when the condition is met includes:

computing and acquiring, according to the starting period and the subframe offset that are of the contention timeslot, the moment of starting the contention timeslot, and starting the contention timeslot at the moment; and the sending a second channel contention frame includes:
sending the second channel contention frame according to the sequence in which the terminal preempts the channel.

With reference to the sixth possible implementation manner of the first aspect, in an eighth possible implementation manner of the first aspect, the contention timeslot configuration information further includes: a starting trigger condition of the contention timeslot; and the acquiring, according to the contention timeslot configuration information, a condition for starting a contention timeslot, and starting the contention timeslot when the condition is met includes:

monitoring an uplink channel and/or a downlink channel according to the starting trigger condition of the contention timeslot, and starting the contention timeslot when an event meeting the starting trigger condition is generated.

With reference to any one of the sixth to the eighth possible implementation manners of the first aspect, in a ninth possible implementation manner of the first aspect, after the performing a corresponding operation within the contention timeslot according to the time configuration of the contention timeslot to contend for a channel of an unlicensed frequency band, the method further includes:

feeding back a channel contention result by using an uplink resource in the terminal feedback uplink configuration.

With reference to any one of the sixth to the ninth possible implementation manners of the first aspect, in a tenth possible implementation manner of the first aspect, after the performing a corresponding operation within the contention timeslot according to the time configuration of the contention timeslot to contend for a channel of an unlicensed frequency band, the method further includes:

if contention for the channel of the unlicensed frequency band succeeds, performing data exchange with the second network device by using the channel of the unlicensed frequency band; and if the contention for the channel of the unlicensed frequency band fails, withdrawing, according to the contention backoff time, from the contention for the channel until the contention backoff time expires, and within the channel listening time length, re-monitoring the first channel contention frame sent by the second network device and/or re-listening to the status of the channel of the unlicensed frequency band.

With reference to any one of the sixth to the tenth possible implementation manners of the first aspect, in an eleventh possible implementation manner of the first aspect, before the acquiring, according to contention timeslot configuration information, a condition for starting a contention timeslot, and starting the contention timeslot when the condition is met, the method further includes:

receiving contention timeslot configuration information sent by a first network device.

According to a second aspect, an embodiment of the present invention provides a second network device, including:

a timeslot starting module, configured to acquire, according to contention timeslot configuration information, a condition for starting a contention timeslot, and start the contention timeslot when the condition is met, where the contention timeslot configuration information includes at least one of the following configurations: a time configuration of the contention timeslot, a contention backoff time, a terminal feedback uplink configuration, or a channel available condition; and a contention module, configured to perform a corresponding operation within the contention timeslot according to the time configuration of the contention timeslot to contend for a channel of an unlicensed frequency band, so as to implement data transmission on the unlicensed frequency band, where the time configuration of the contention timeslot includes an idle time length, a channel listening time length, or a channel preemption time length.

With reference to the second aspect, in a first possible implementation manner of the second aspect, the contention module is specifically configured to: remain, beginning from a moment of starting the contention timeslot, an idle state within the idle time length, then listen to a status of the channel of the unlicensed frequency band within the channel listening time length, determine, according to the channel available condition, whether the channel of the unlicensed frequency band is available, and send a first channel contention frame if the channel of the unlicensed frequency band is available, where the first channel contention frame carries the channel preemption time length.

With reference to the second aspect or the first possible implementation manner of the second aspect, in a second possible implementation manner of the second aspect, the contention timeslot configuration information further includes: a starting period and subframe offset that are of the contention timeslot; and the timeslot starting module is specifically configured to compute and acquire, according to the starting period and the subframe offset that are of the contention timeslot, the moment of starting the contention timeslot, and start the contention timeslot at the moment.

With reference to the second aspect or the first possible implementation manner of the second aspect, in a third possible implementation manner of the second aspect, the contention timeslot configuration information further includes: a starting trigger condition of the contention timeslot; and the timeslot starting module is specifically configured to monitor an uplink channel and/or a downlink channel according to the starting trigger condition of the contention timeslot, and start the contention timeslot when an event meeting the starting trigger condition is generated.

With reference to the second aspect, or any one of the first to the third possible implementation manners of the second aspect, in a fourth possible implementation manner of the second aspect, the second network device further includes:

a notification module, configured to notify a terminal of a channel contention result.

With reference to the second aspect, or any one of the first to the fourth possible implementation manners of the second aspect, in a fifth possible implementation manner of the second aspect, the second network device further includes:

a backoff module, configured to: if contention for the channel of the unlicensed frequency band fails, withdraw, according to the contention backoff time, from the contention for the channel until the contention backoff time expires, and re-sense the status of the channel of the unlicensed frequency band within the channel listening time length.

According to a third aspect, an embodiment of the present invention provides a terminal, including:

a timeslot starting module, configured to acquire, according to contention timeslot configuration information, a condition for starting a contention timeslot, and start the contention timeslot when the condition is met, where the contention timeslot configuration information includes at least one of the following configurations: a time configuration of the contention timeslot, a contention backoff time, a terminal feedback uplink configuration, or a channel available condition; and a contention module, configured to perform a corresponding operation within the contention timeslot according to the time configuration of the contention timeslot to contend for a channel of an unlicensed frequency band, so as to implement data transmission on the unlicensed frequency band, where the time configuration of the contention timeslot includes an idle time length, a channel listening time length, or a channel preemption time length.

With reference to the third aspect, in a first possible implementation manner of the third aspect, the contention module is specifically configured to: remain, beginning from a moment of starting the contention timeslot, an idle state within the idle time length, then within the channel listening time length, monitor a first channel contention frame sent by a second network device and/or listen to a status of the channel of the unlicensed frequency band, and send a second channel contention frame if the first channel contention frame is received and/or the channel of the unlicensed frequency band is available, where the second channel contention frame carries the channel preemption time length.

With reference to the third aspect or the first possible implementation manner of the third aspect, in a second possible implementation manner of the third aspect, the contention timeslot configuration information further includes: a starting period and subframe offset that are of the contention timeslot, and a sequence in which the terminal preempts the channel;

the timeslot starting module is specifically configured to compute and acquire, according to the starting period and the subframe offset that are of the contention timeslot, the moment of starting the contention timeslot, and start the contention timeslot at the moment; and the contention module is specifically configured to remain, beginning from the moment of starting the contention timeslot, the idle state within the idle time length, then within the channel listening time length, monitor the first channel contention frame sent by the second network device and/or sense the status of the channel of the unlicensed frequency band, and if the first channel contention frame is received and/or the channel of the unlicensed frequency band is available, send the second channel contention frame according to the sequence in which the terminal preempts the channel, where the second channel contention frame carries the channel preemption time length.

With reference to the third aspect or the first possible implementation manner of the third aspect, in a third possible implementation manner of the third aspect, the contention timeslot configuration information further includes: a starting trigger condition of the contention timeslot; and the timeslot starting module is specifically configured to monitor an uplink channel and/or a downlink channel according to the starting trigger condition of the contention timeslot, and start the contention timeslot when an event meeting the starting trigger condition is generated.

With reference to the third aspect, or any one of the first to the third possible implementation manners of the third aspect, in a fourth possible implementation manner of the third aspect, the terminal further includes:

a feedback module, configured to feed back a channel contention result by using an uplink resource in the terminal feedback uplink configuration.

With reference to the third aspect, or any one of the first to the fourth possible implementation manners of the third aspect, in a fifth possible implementation manner of the third aspect, the terminal further includes:

a data exchange module, configured to: if contention for the channel of the unlicensed frequency band succeeds, perform data exchange with the second network device by using the channel of the unlicensed frequency band; and a backoff module, configured to: if the contention for the channel of the unlicensed frequency band fails, withdraw, according to the contention backoff time, from the contention for the channel until the contention backoff time expires, and within the channel listening time length, re-monitor the first channel contention frame sent by the second network device and/or re-sense the status of the channel of the unlicensed frequency band.

With reference to the third aspect, or any one of the first to the fifth possible implementation manners of the third aspect, in a sixth possible implementation manner of the third aspect, the terminal further includes:

a receiving module, configured to receive contention timeslot configuration information sent by a first network device.

According to a fourth aspect, an embodiment of the present invention provides a second network device, including:

a processor, configured to: acquire, according to contention timeslot configuration information, a condition for starting a contention timeslot, and start the contention timeslot when the condition is met, where the contention timeslot configuration information includes at least one of the following configurations: a time configuration of the contention timeslot, a contention backoff time, a terminal feedback uplink configuration, or a channel available condition; and perform a corresponding operation within the contention timeslot according to the time configuration of the contention timeslot to contend for a channel of an unlicensed frequency band, so as to implement data transmission on the unlicensed frequency band, where the time configuration of the contention timeslot includes an idle time length, a channel listening time length, or a channel preemption time length.

With reference to the fourth aspect, in a first possible implementation manner of the fourth aspect, the second network device further includes a transmitter; where the processor is specifically configured to remain, beginning from a moment of starting the contention timeslot, an idle state within the idle time length, then listen to a status of the channel of the unlicensed frequency band within the channel listening time length, and determine, according to the channel available condition, whether the channel of the unlicensed frequency band is available; and the transmitter is configured to send a first channel contention frame if the channel of the unlicensed frequency band is available, where the first channel contention frame carries the channel preemption time length.

With reference to the fourth aspect or the first possible implementation manner of the fourth aspect, in a second possible implementation manner of the fourth aspect, the contention timeslot configuration information further includes: a starting period and subframe offset that are of the contention timeslot; and the processor is specifically configured to compute and acquire, according to the starting period and the subframe offset that are of the contention timeslot, the moment of starting the contention timeslot, and start the contention timeslot at the moment.

With reference to the fourth aspect or the first possible implementation manner of the fourth aspect, in a third possible implementation manner of the fourth aspect, the contention timeslot configuration information further includes: a starting trigger condition of the contention timeslot; and the processor is specifically configured to monitor an uplink channel and/or a downlink channel according to the starting trigger condition of the contention timeslot, and start the contention timeslot when an event meeting the starting trigger condition is generated.

With reference to the fourth aspect, or any one of the first to the third possible implementation manners of the fourth aspect, in a fourth possible implementation manner of the fourth aspect, the processor is further configured to notify a terminal of a channel contention result.

With reference to the fourth aspect, or any one of the first to the fourth possible implementation manners of the fourth aspect, in a fifth possible implementation manner of the fourth aspect, the processor is further configured to: if contention for the channel of the unlicensed frequency band fails, withdraw, according to the contention backoff time, from the contention for the channel until the contention backoff time expires, and re-sense the status of the channel of the unlicensed frequency band within the channel listening time length.

According to a fifth aspect, an embodiment of the present invention provides a terminal, including:

a processor, configured to: acquire, according to contention timeslot configuration information, a condition for starting a contention timeslot, and start the contention timeslot when the condition is met, where the contention timeslot configuration information includes at least one of the following configurations: a time configuration of the contention timeslot, a contention backoff time, a terminal feedback uplink configuration, or a channel available condition; and perform a corresponding operation within the contention timeslot according to the time configuration of the contention timeslot to contend for a channel of an unlicensed frequency band, so as to implement data transmission on the unlicensed frequency band, where the time configuration of the contention timeslot includes an idle time length, a channel listening time length, or a channel preemption time length.

With reference to the fifth aspect, in a first possible implementation manner of the fifth aspect, the terminal further includes a transmitter; where the processor is specifically configured to remain, beginning from a moment of starting the contention timeslot, an idle state within the idle time length, then within the channel listening time length, monitor a first channel contention frame sent by a second network device and/or listen to a status of the channel of the unlicensed frequency band; and the transmitter is configured to send a second channel contention frame if the first channel contention frame is received and/or the channel of the unlicensed frequency band is available, where the second channel contention frame carries the channel preemption time length.

With reference to the fifth aspect or the first possible implementation manner of the fifth aspect, in a second possible implementation manner of the fifth aspect, the contention timeslot configuration information further includes: a starting period and subframe offset that are of the contention timeslot, and a sequence in which the terminal preempts the channel;

the processor is specifically configured to compute and acquire, according to the starting period and the subframe offset that are of the contention timeslot, the moment of starting the contention timeslot, and start the contention timeslot at the moment; and the transmitter is specifically configured to: if the first channel contention frame is received and/or the channel of the unlicensed frequency band is available, send the second channel contention frame according to the sequence in which the terminal preempts the channel, where the second channel contention frame carries the channel preemption time length.

With reference to the fifth aspect or the first possible implementation manner of the fifth aspect, in a third possible implementation manner of the fifth aspect, the contention timeslot configuration information further includes: a starting trigger condition of the contention timeslot; and the processor is specifically configured to monitor an uplink channel and/or a downlink channel according to the starting trigger condition of the contention timeslot, and start the contention timeslot when an event meeting the starting trigger condition is generated.

With reference to the fifth aspect, or any one of the first to the third possible implementation manners of the fifth aspect, in a fourth possible implementation manner of the fifth aspect, the transmitter is further configured to feed back a channel contention result by using an uplink resource in the terminal feedback uplink configuration.

With reference to the fifth aspect, or any one of the first to the fourth possible implementation manners of the fifth aspect, in a fifth possible implementation manner of the fifth aspect, the terminal further includes a receiver; where the transmitter is further configured to: if contention for the channel of the unlicensed frequency band succeeds, send data to the second network device by using the channel of the unlicensed frequency band;

the processor is further configured to: if the contention for the channel of the unlicensed frequency band fails, withdraw, according to the contention backoff time, from the contention for the channel until the contention backoff time expires, and within the channel listening time length, re-monitor the first channel contention frame sent by the second network device and/or re-sense the status of the channel of the unlicensed frequency band; and the receiver is configured to: if the contention for the channel of the unlicensed frequency band succeeds, receive, by using the channel of the unlicensed frequency band, data sent by the second network device.

With reference to the fifth aspect, or any one of the first to the fifth possible implementation manners of the fifth aspect, in a sixth possible implementation manner of the fifth aspect, the receiver is further configured to receive contention timeslot configuration information sent by a first network device.

According to a sixth aspect, an embodiment of the present invention provides a system for contending for a channel of an unlicensed frequency band, including: a first network device, a second network device, and a terminal; where the first network device and the second network device support carrier aggregation, the first network device uses a spectrum resource of a licensed frequency band, the second network device uses a spectrum resource of an unlicensed frequency band, the first network device is a primary network device, and the second network device is a secondary network device of the first network device;

the second network device includes the second network device apparatus according to the second aspect, or any one of the first to the fifth possible implementation manners of the second aspect; and the terminal includes the terminal apparatus according to the third aspect, or any one of the first to the sixth possible implementation manners of the third aspect.

According to a seventh aspect, an embodiment of the present invention provides a system for contending for a channel of an unlicensed frequency band, including: a first network device, a second network device, and a terminal; where the first network device and the second network device support carrier aggregation, the first network device uses a spectrum resource of a licensed frequency band, the second network device uses a spectrum resource of an unlicensed frequency band, the first network device is a primary network device, and the second network device is a secondary network device of the first network device;

the second network device includes the second network device according to the fourth aspect, or any one of the first to the fifth possible implementation manners of the fourth aspect; and the terminal includes the terminal according to the fifth aspect, or any one of the first to the sixth possible implementation manners of the fifth aspect.

According to the method and system for contending for a channel of an unlicensed frequency band, and the apparatus provided in the embodiments of the present invention, an LTE device contending for a channel enters a contention timeslot according to contention timeslot configuration information, and performs a corresponding operation within the contention timeslot according to a time configuration of the contention timeslot to contend for a channel of an unlicensed frequency band, so as to implement data transmission in an LTE carrier aggregation technology by using the unlicensed frequency band, so that an LTE user and another RAT user fairly and properly use unlicensed spectrum resources, and a mutual interference problem is resolved.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
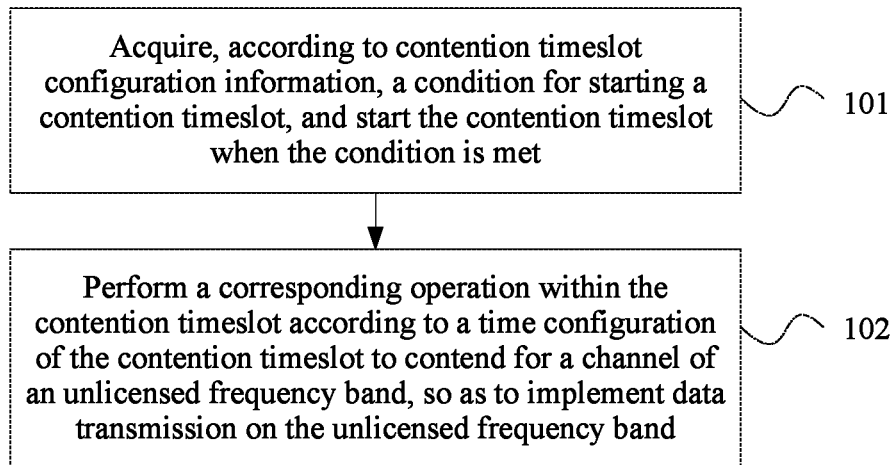
FIG. 1 is a flowchart of Embodiment 1 of a method for contending for a channel of an unlicensed frequency band according to the present invention.

FIG. 1 is a flowchart of Embodiment 1 of a method for contending for a channel of an unlicensed frequency band according to the present invention. As shown in FIG. 1, the method in this embodiment may include the following steps:

Step 101: Acquire, according to contention timeslot configuration information, a condition for starting a contention timeslot, and start the contention timeslot when the condition is met.

In this embodiment, the contention timeslot configuration information includes at least one of the following configurations: a time configuration of the contention timeslot, a contention backoff time, a terminal feedback uplink configuration, or a channel available condition. The contention timeslot configuration information may be configured by a base station according to a resource scheduling status. The contention backoff time is duration during which a device contending for a channel needs to back off after one contention failure, and the device contending for the channel may be a secondary serving cell or a secondary eNodeB in an LTE carrier aggregation technology, or may be an LTE terminal device. The terminal feedback uplink configuration is configuration information of an uplink resource used when user equipment (User Equipment, UE for short) feeds back a contention result to the base station after contending for the channel. The channel available condition is a condition under which the device contending for the channel determines whether the channel is available. For example, the condition may be that the device performs channel listening by means of physical layer energy detection or by means of carrier-sense multiple access/collision avoidance (Carrier-Sense Multiple Access/Collision avoidance, CSMA/CA for short). If detected physical layer energy, that is, signal strength is less than the threshold, is the device considers that the channel is idle and available, or determines whether the channel is available according to whether a broadcast signal is detected on the channel.

According to the latest released Federal Communications Commission international spectrum white paper, unlicensed spectrum (unlicensed spectrum) resources are more than licensed spectrum resources. An unlicensed spectrum includes frequency bands used for devices in fields such as industrial, scientific and medical (Industrial, scientific and medical, ISM for short). For example, there are three unlicensed frequency bands in the United States: 902-928 MHz, 2400-2484.5 MHz, and 5725-5850 MHz, where a frequency band of 2.4 GHz is an ISM frequency band common for all countries. At present, an ISM frequency band of 2.4 GHz mainly uses technologies such as wireless local area network (Wireless Local Area Networks, WLAN for short), Bluetooth, and Zigbee (Zigbee). Based on the Institute of Electrical and Electronics Engineers (Institute of Electrical and Electronics Engineers, IEEE for short) 802.11 family of standards, such as 802.11a, 802.11b, 802.11g, 802.11n, and 802.11ac, the 802.11ac protocol may support, by means of channelization (channelization), bandwidth categories such as 20 MHz, 40 MHz, 80 MHz, and 160 MHz. If the 3GPP LTE is applied to an unlicensed frequency band, the spectrum resources of the unlicensed frequency band may be used more effectively, increasing an available spectrum bandwidth of an LTE user. The spectrum resources of the unlicensed frequency band may be shared by many users. These users may belong to different radio access technologies (Radio Access Technology, RAT for short), such as LTE, wireless fidelity (Wireless Fidelity, Wi-Fi for short), and Bluetooth (bluetooth). In this case, all UEs using the unlicensed spectrum need to first listen to, before transmission, whether the channel of the unlicensed frequency band is idle, that is, "listen before talk (Listen before Talk, LBT for short)", so as to avoid causing interference to another UE that is using the channel of the unlicensed frequency band. In addition, after acquiring permission to use the channel of the unlicensed frequency band, UE also imposes a corresponding limitation on a maximum occupation time of the channel, that is, the UE needs to release the channel after occupying the channel for a specific time, and re-start contending for the channel of the unlicensed frequency band after the UE remains idle for a specific time, so as to give each UE a chance of fairly contending for and using the spectrum resources of the unlicensed frequency band.

In this embodiment, the device contending for the channel acquires, according to the contention timeslot configuration information, the condition for starting the contention timeslot, that is, in a normal state, the device does not join contention for the channel of the unlicensed frequency band, and joins the contention only within the contention timeslot. Therefore, the device contending for the channel first needs to acquire the condition for starting the contention timeslot. When the condition is met, the device contending for the channel starts the contention timeslot, and contends for the channel of the unlicensed frequency band within the contention timeslot.

Step 102: Perform a corresponding operation within the contention timeslot according to a time configuration of the contention timeslot to contend for a channel of an unlicensed frequency band, so as to implement data transmission on the unlicensed frequency band.

In this embodiment, the time configuration of the contention timeslot includes an idle time length, a channel listening time length, or a channel preemption time length. The device contending for the channel performs the corresponding operation within the contention timeslot according to the foregoing three time lengths to contend for the channel of the unlicensed frequency band, that is, the device contending for the channel needs to perform three operations within the contention timeslot, including idle waiting, channel listening, and channel preemption. Duration of the idle waiting herein may be 0, and the device contending for the channel may directly enter a channel listening stage and a channel preemption stage without a need of going through an idle stage.

Figure 2:
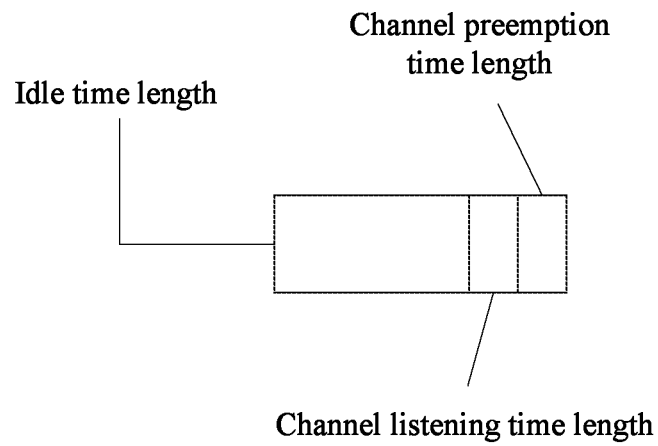
FIG. 2 is a schematic diagram of a contention timeslot of Embodiment 1 of a method for contending for a channel of an unlicensed frequency band according to the present invention.

FIG. 2 is a schematic diagram of a contention timeslot of Embodiment 1 of a method for contending for a channel of an unlicensed frequency band according to the present invention. As shown in FIG. 2, a contention timeslot started by a device contending for a channel includes three parts: an idle time length, a channel listening time length, or a channel preemption time length. A purpose of the idle time length is that according to laws and regulations regarding channel use, a network device or a terminal needs to remain idle for a period of time after occupying the channel for a period of time, so that another device preempts and uses the channel. According to regulations of the ETSI, the idle time length may be 5% of a time during which the device occupies the channel, and according to a network configuration, the idle time length may not be configured, that is, the idle time length may be 0. A specific idle time length may be determined according to a practical situation, which is not specifically limited herein. The channel listening time length indicates a time length during which the network device or the terminal performs channel listening by means of physical layer energy detection or by means of carrier-sense multiple access/collision avoidance (Carrier-Sense Multiple Access/Collision avoidance, CSMA/CA for short), where the physical layer energy detection or the CSMA/CA is used to determine whether the channel is available. For example, when detected physical layer energy is so little that it is less than a preset threshold, in this case, it is determined that the channel is idle and available. For another example, the network device or the terminal detects, on the channel, a request to send (Request To Send, RTS for short) frame or a clear to send (Clear To Send, CTS for short) frame sent by the another device, and in this case, it is considered that the channel is occupied and unavailable. The channel preemption time length indicates a time length during which the network device or the terminal occupies the channel of the unlicensed frequency band. The network device or the terminal completes preemption of the channel by sending the RTS frame or the CTS frame, and sets a transmission duration (duration) value in a control area of the RTS frame or of the CTS frame to a time length during which the network device or the terminal is expected to occupy the channel of the unlicensed frequency band, that is, the channel preemption time length, so that another RAT user does not use the channel of the unlicensed frequency band within the channel preemption time length after receiving the RTS frame or the CTS frame.

In this embodiment, a device contending for a channel enters a contention timeslot according to contention timeslot configuration information, and performs a corresponding operation within the contention timeslot according to a time configuration of the contention timeslot to contend for a channel of an unlicensed frequency band, so as to implement data transmission in an LTE carrier aggregation technology by using the unlicensed frequency band, so that an LTE user and another RAT user fairly and properly use unlicensed spectrum resources, and a mutual interference problem is resolved.

Figure 3:
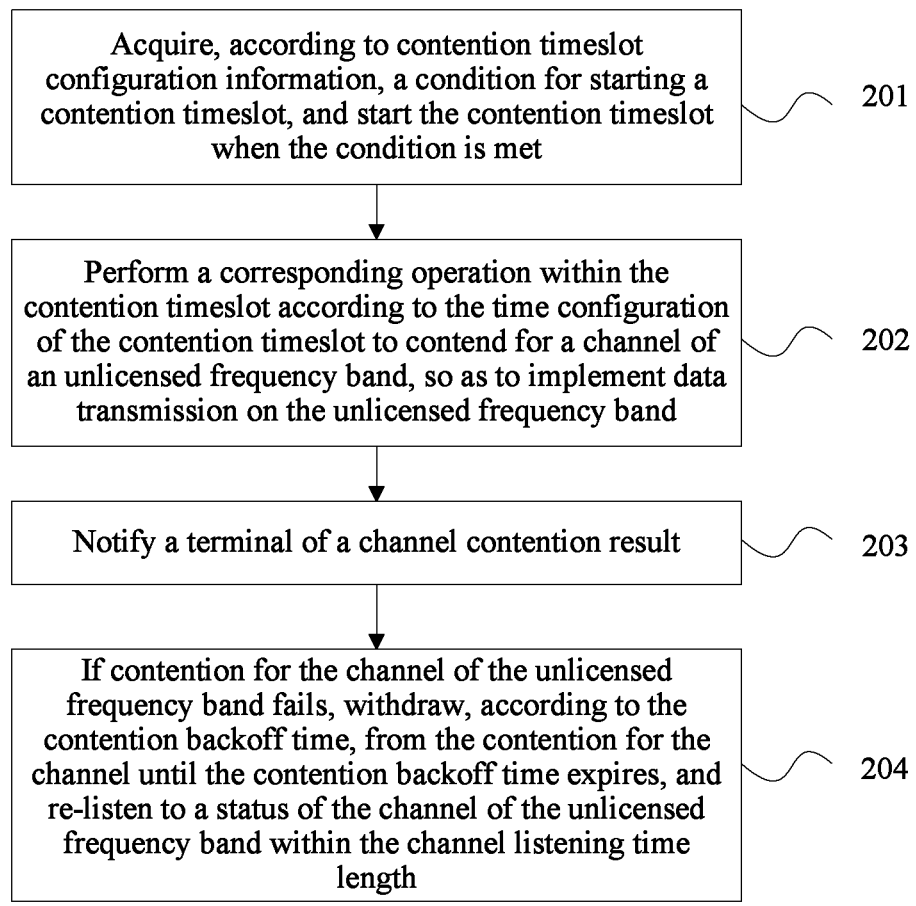
FIG. 3 is a flowchart of Embodiment 2 of a method for contending for a channel of an unlicensed frequency band according to the present invention.

FIG. 3 is a flowchart of Embodiment 2 of a method for contending for a channel of an unlicensed frequency band according to the present invention. As shown in FIG. 3, this embodiment may be executed by a second network device. The method in this embodiment may include the following steps:

Step 201: Acquire, according to contention timeslot configuration information, a condition for starting a contention timeslot, and start the contention timeslot when the condition is met.

In this embodiment, the second network device may be a secondary serving cell or a secondary eNodeB in an LTE carrier aggregation technology. Herein, a processing procedure of the secondary serving cell is basically the same as that of the secondary eNodeB, and a difference lies in that if the second network device is the secondary eNodeB, because the secondary eNodeB and a master eNodeB are not a same base station, the secondary eNodeB first needs to perform interaction of the contention timeslot configuration information with the master eNodeB. In this embodiment, it may be that the master eNodeB first configures the contention timeslot configuration information, and then sends the contention timeslot configuration information to the secondary eNodeB, or it may be that the secondary eNodeB first configures the contention timeslot configuration information, and then sends the contention timeslot configuration information to the master eNodeB. No specific limitation is imposed herein on an interaction process.

The second network device acquires, according to the contention timeslot configuration information, the condition for starting the contention timeslot. Specifically, the condition for starting the contention timeslot may be classified into two types according to a difference of specific information included in the contention timeslot configuration information. One type is that the contention timeslot configuration information further includes a starting period and subframe offset that are of the contention timeslot, and in this case, the second network device computes and acquires, according to the starting period and the subframe offset that are of the contention timeslot, a moment of starting the contention timeslot, and starts the contention timeslot at the moment. For example, the starting period is five milliseconds, the subframe offset is 1, and in this case, the computed and acquired moment of starting the contention timeslot may be the second millisecond or the seventh millisecond within a large LTE frame (ten milliseconds in total). The other type is that the contention timeslot configuration information further includes a starting trigger condition of the contention timeslot, and in this case, the second network device monitors an uplink channel and/or a downlink channel according to the starting trigger condition of the contention timeslot, and starts the contention timeslot when an event meeting the starting trigger condition is generated. For example, if a first network device sends data to a terminal by using the second network device, there is data arriving on the downlink channel, and in this case, the second network device can start the contention timeslot, where the first network device herein is a primary serving cell or a master eNodeB in the LTE carrier aggregation technology.

Step 202: Perform a corresponding operation within the contention timeslot according to the time configuration of the contention timeslot to contend for a channel of an unlicensed frequency band, so as to implement data transmission on the unlicensed frequency band.

In this embodiment, the second network device remains, beginning from a moment of starting the contention timeslot, an idle state within the idle time length, then listens to a status of the channel of the unlicensed frequency band within the channel listening time length, determines, according to the channel available condition, whether the channel of the unlicensed frequency band is available, and sends a first channel contention frame if the channel of the unlicensed frequency band is available, where the first channel contention frame carries the channel preemption time length. It can be learned, according to the schematic diagram of the contention timeslot shown in FIG. 2, that the idle time length may be 0, that is, the second network device may directly enter a channel listening stage at the moment of starting the contention timeslot, and sense the status of the channel of the unlicensed frequency band within the channel listening time length, determine, according to the channel available condition in the contention timeslot configuration information, whether the channel of the unlicensed frequency band is available, and send the first channel contention frame when the second network device determines that the channel is available, where the first channel contention frame may be an RTS frame or a CTS frame. The second network device notifies, by using the channel preemption time length carried in the first channel contention frame, another user of duration during which the channel is to be occupied, so that the another user sets its own backoff time according to the duration.

Step 203: Notify a terminal of a channel contention result.

In this embodiment, the second network device notifies the terminal of the channel contention result, that is, regardless of whether the contention succeeds or fails, the second network device needs to notify the terminal of the result. Specifically, if contention performed by the second network device succeeds, it indicates that the second network device successfully sends the RTS frame or the CTS frame, and in this case, as long as the terminal may receive the RTS frame or the CTS frame, the terminal may learn that contending for the channel of the unlicensed frequency band by the second network device succeeds; on the contrary, if detecting that the channel is unavailable, the second network device does not send the RTS frame or the CTS frame, and if the terminal does not detect the RTS frame or the CTS frame sent by the second network device, it is considered that the second network device does not successfully obtains the channel by means of contention, and the channel is unavailable; or if the second network device does not successfully obtains the channel by means of contention, the UE is notified by the first network device. For example, the first network device sends physical downlink control channel (Physical Downlink Control Channel, PDCCH for short) control information or physical downlink shared channel (Physical Uplink Shared Channel, PUSCH for short) downlink data to the terminal, so as to notify the terminal that contending for the channel by the second network device fails, and the channel is unavailable.

Step 204: If contention for the channel of the unlicensed frequency band fails, withdraw, according to the contention backoff time, from the contention for the channel until the contention backoff time expires, and re-listen to a status of the channel of the unlicensed frequency band within the channel listening time length.

In this embodiment, contending for the channel of the unlicensed frequency band in the contention timeslot by the second network device fails, and in this case, the second network device withdraws, according to the contention backoff time in the contention timeslot configuration information, from the contention for the channel until the contention backoff time expires, and then re-starts the contention for the channel, where the contention backoff time herein may be implemented by using a timer. After the timer expires, the second network device may directly enter the channel listening stage without going through the idle time length in the contention timeslot again. It should be noted that the second network device may start the contention timeslot based on periodic trigger or event trigger, and contend for the channel of the unlicensed frequency band within the contention timeslot, or after the contention for the channel fails, the second network device may back off for a specific time, and then re-sense the channel and re-contend for the channel, which may be considered as two cases of triggering the contention for the channel. The two cases are mutually supported, and do not conflict in terms of time.

In this embodiment, a second network device starts a contention timeslot by means of periodic trigger or event trigger, and performs a corresponding operation within the contention timeslot according to a time configuration of the contention timeslot to contend for a channel of an unlicensed frequency band, so as to implement data transmission in an LTE carrier aggregation technology by using the unlicensed frequency band, so that an LTE user and another RAT user fairly and properly use unlicensed spectrum resources, and a mutual interference problem is resolved.

Figure 4:
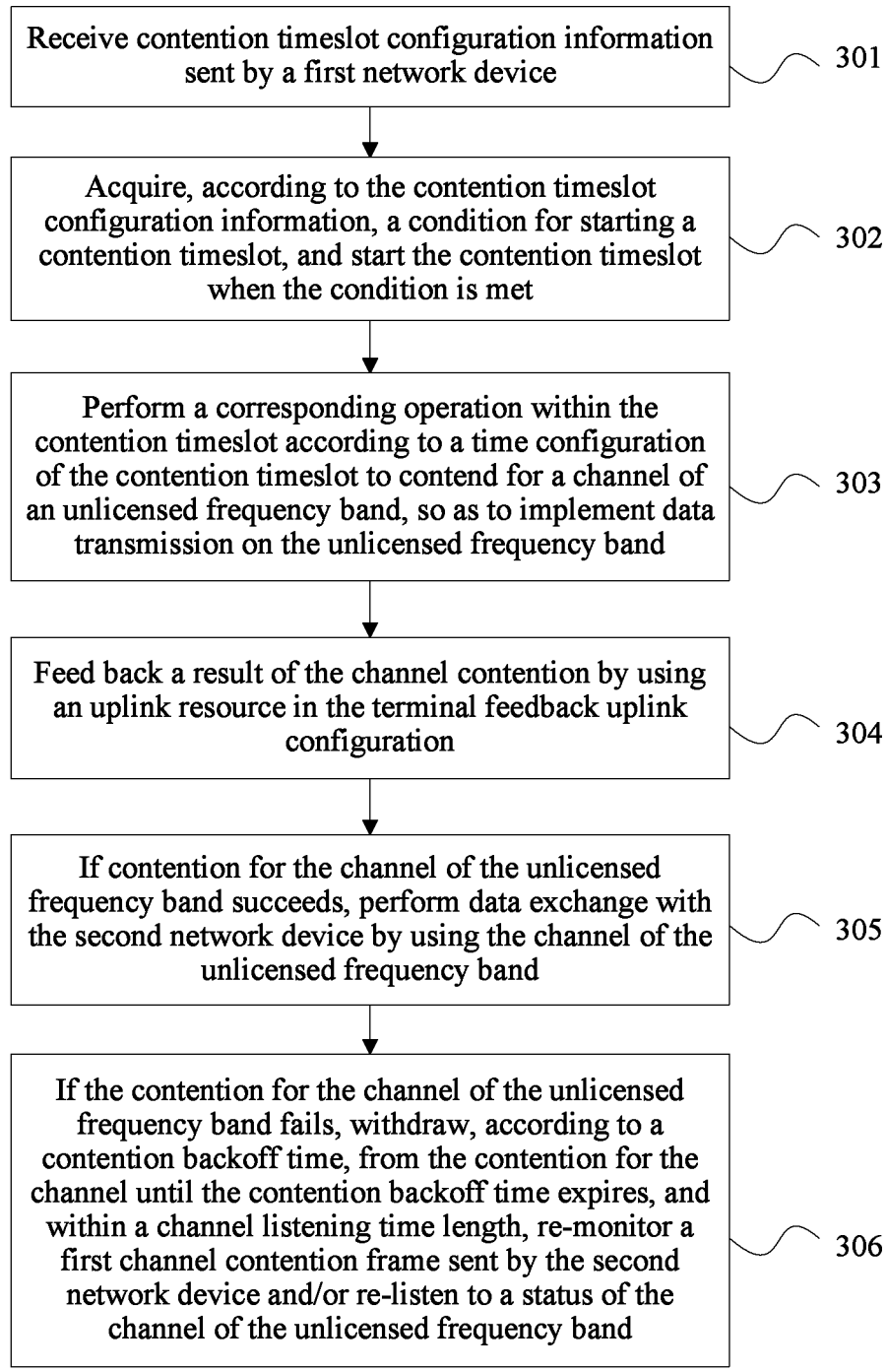
FIG. 4 is a flowchart of Embodiment 3 of a method for contending for a channel of an unlicensed frequency band according to the present invention.

FIG. 4 is a flowchart of Embodiment 3 of a method for contending for a channel of an unlicensed frequency band according to the present invention. As shown in FIG. 4, this embodiment may be executed by a terminal. The method in this embodiment may include the following steps:

Step 301: Receive contention timeslot configuration information sent by a first network device.

In this embodiment, the terminal may be LTE UE, and the first network device may be a primary serving cell or a master eNodeB in an LTE carrier aggregation technology. The terminal receives the contention timeslot configuration information sent by the first network device.

Step 302: Acquire, according to the contention timeslot configuration information, a condition for starting a contention timeslot, and start the contention timeslot when the condition is met.

In this embodiment, the terminal acquires, according to the contention timeslot configuration information, the condition for starting the contention timeslot. Specifically, the condition for starting the contention timeslot may be classified into two types according to a difference of specific information included in the contention timeslot configuration information. One type is that the contention timeslot configuration information further includes a starting period and subframe offset that are of the contention timeslot, and a sequence in which the terminal preempts the channel, and in this case, the terminal computes and acquires, according to the starting period and the subframe offset that are of the contention timeslot, a moment of starting the contention timeslot, and starts the contention timeslot at the moment. For example, the starting period is ten milliseconds, and the subframe offset is 2, and in this case, the computed and acquired moment of starting the contention timeslot may be the third millisecond within a large LTE frame (ten milliseconds in total). It should be noted that in a case in which the terminal periodically starts the contention timeslot, it may be computed, according to the contention timeslot configuration information configured by the first network device, that multiple terminals start the contention timeslot at a same moment, and send a second channel contention frame at the same moment. Therefore, to avoid mutual interference, the terminal sends, according to a sequence, in the contention timeslot configuration information, in which the terminal preempts the channel, the second channel contention frame in turn, and in this way, conflict may be avoided. The other type is that the contention timeslot configuration information further includes a starting trigger condition of the contention timeslot, and in this case, the terminal monitors an uplink channel and/or a downlink channel according to the starting trigger condition of the contention timeslot, and starts the contention timeslot when an event meeting the starting trigger condition is generated. For example, if the first network device has downlink data that needs to be delivered to the terminal by using a second network device, the first network device may deliver a command to instruct the terminal to start the contention timeslot, where the command instruction may be specifically PDCCH control information, a Medium Access Control Control Element (Medium Access Control Control Element, MAC CE for short), or a Radio Resource Control (Radio Resource Control, RRC for short) command. For another example, if the terminal has uplink data that needs to be sent, the contention timeslot may be started by bringing forward N (N is greater than or equal to 0) subframes. For another example, after occupying the channel of the unlicensed frequency band for a period of time, the terminal automatically starts the contention timeslot.

Step 303: Perform a corresponding operation within the contention timeslot according to a time configuration of the contention timeslot to contend for a channel of an unlicensed frequency band, so as to implement data transmission on the unlicensed frequency band.

In this embodiment, the terminal remains, beginning from a moment of starting the contention timeslot, an idle state within the idle time length, then within the channel listening time length, monitors a first channel contention frame sent by a second network device and/or listens to a status of the channel of the unlicensed frequency band, and sends a second channel contention frame if the first channel contention frame is received and/or the channel of the unlicensed frequency band is available, where the second channel contention frame carries the channel preemption time length. It can be learned, according to the schematic diagram of the contention timeslot shown in FIG. 2, that the idle time length may be 0, that is, the terminal may directly enter a channel listening stage at the moment of starting the contention timeslot, and within the channel listening time length, monitor the first channel contention frame sent by the second network device and/or sense the status of the channel of the unlicensed frequency band. Herein, that the terminal determines whether the channel is available may be determined by using at least one of the foregoing methods. If the terminal receives the first channel contention frame sent by the second network device, it indicates that the second network device obtains the channel by means of contention, and the channel is available. The terminal may also sense the status of the channel of the unlicensed frequency band, for example, the terminal determines, by using physical layer energy, whether the channel is available. These two methods may be both used to determine whether the channel is idle. When the terminal determines that the channel is available, the second channel contention frame is sent, where the second channel contention frame may be an RTS frame or a CTS frame. The terminal notifies, by using the channel preemption time length carried in the second channel contention frame, another user of duration during which the channel is to be occupied, so that the another user sets its own backoff time according to the duration.

Step 304: Feed back a channel contention result by using an uplink resource in the terminal feedback uplink configuration.

In this embodiment, regardless of whether the contention for the channel succeeds or fails, the terminal needs to feed back the result of the contention to a first network. The uplink resource used by the terminal to feed back the result of the contention may be acquired according to the terminal feedback uplink configuration in the contention timeslot configuration information. When sending the contention timeslot configuration information to the terminal, the first network device configures, for the terminal in advance, the uplink resource used for feeding back the result, where the uplink resource may, for example, be a physical uplink control channel (Physical Uplink Control Channel, PUCCH for short) or a physical uplink shared channel (Physical Uplink Shared Channel, PUSCH for short). The terminal feeds back, to the first network device, a result indicating whether preemption of the channel of the unlicensed frequency band succeeds, so that the first network device decides whether to schedule the terminal.

Step 305: If contention for the channel of the unlicensed frequency band succeeds, perform data exchange with the second network device by using the channel of the unlicensed frequency band.

In this embodiment, the contention for the channel by the terminal succeeds, that is, the terminal successfully sends an RTS frame or a CTS frame. Afterwards, the terminal may perform the data exchange with the second network device by using an LTE technology on the channel of the unlicensed frequency band.

Step 306: If the contention for the channel of the unlicensed frequency band fails, withdraw, according to the contention backoff time, from the contention for the channel until the contention backoff time expires, and within the channel listening time length, re-monitor a first channel contention frame sent by the second network device and/or re-listen to a status of the channel of the unlicensed frequency band.

In this embodiment, the contention for the channel by the terminal fails, and in this case, the terminal withdraws, according to the contention backoff time in the contention timeslot configuration information, from the contention for the channel, until the contention backoff time expires, then re-starts the contention for the channel, where the contention backoff time herein may be implemented by using a timer. After the timer expires, the terminal may directly enter a channel listening stage without going through the idle time length in the contention timeslot again. It should be noted that the terminal may start the contention timeslot based on periodic trigger or event trigger, and contend for the channel of the unlicensed frequency band within the contention timeslot, or after the contention for the channel fails, the terminal may back off for a specific time, and then re-sense the channel and re-contend for the channel, which may be considered as two cases of triggering the contention for the channel. The two cases are mutually supported, and do not conflict in terms of time.

In this embodiment, a terminal starts a contention timeslot by means of periodic trigger or event trigger, and performs a corresponding operation within the contention timeslot according to a time configuration of the contention timeslot to contend for a channel of an unlicensed frequency band, so as to implement data transmission in an LTE carrier aggregation technology by using the unlicensed frequency band, so that an LTE user and another RAT user fairly and properly use unlicensed spectrum resources, and a mutual interference problem is resolved.

It should be noted that the foregoing method embodiment may be applicable to carrier aggregation within a base station, that is, a first network device and a second network device are respectively a primary serving cell and a secondary serving cell in a same base station, where the primary serving cell uses a spectrum resource of a licensed frequency band, and the secondary serving cell uses a spectrum resource of an unlicensed frequency band. The foregoing method embodiment may further be applicable to carrier aggregation between base stations, which is also referred to as dual connectivity (Dual Connectivity, DC for short)/multiple stream aggregation (Multiple Stream Aggregation, MSA for short), so as to address a scenario of non-ideal transmission resources between sites. The DC/MSA refers to a carrier aggregation technology between two base stations. The first network device is a master eNodeB (Master eNodeB, MeNB for short), and the second network device is a secondary eNodeB (Secondary eNodeB, SeNB for short). The terminal may receive data from the master eNodeB and the secondary eNodeB at the same time, the master eNodeB uses a spectrum resource of a licensed frequency band, and the secondary eNodeB uses a spectrum resource of an unlicensed frequency band.

Figure 5A:
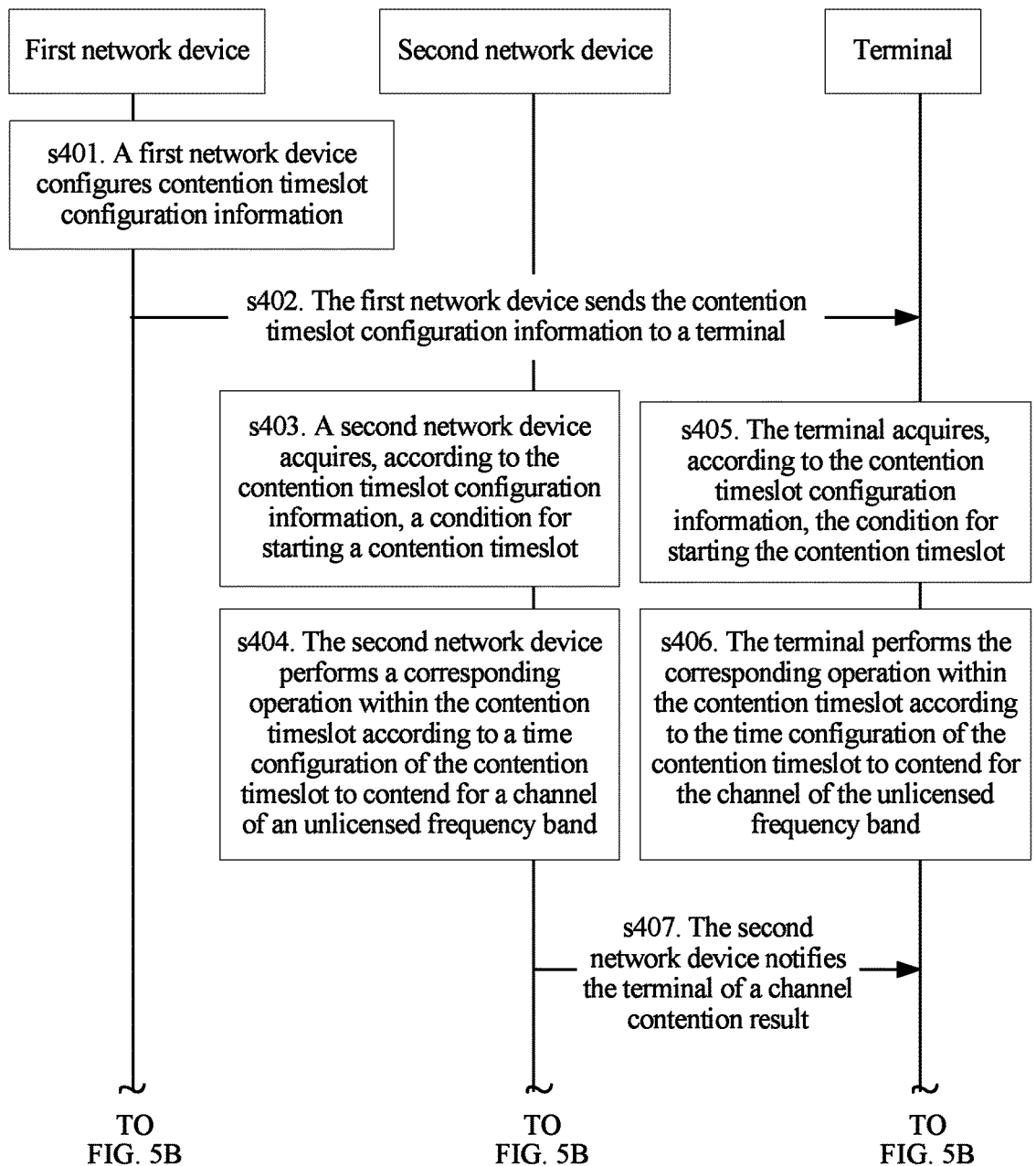
FIG. 5A and FIG. 5B are a flowchart of Embodiment 4 of a method for contending for a channel of an unlicensed frequency band according to the present invention.
Figure 5B:
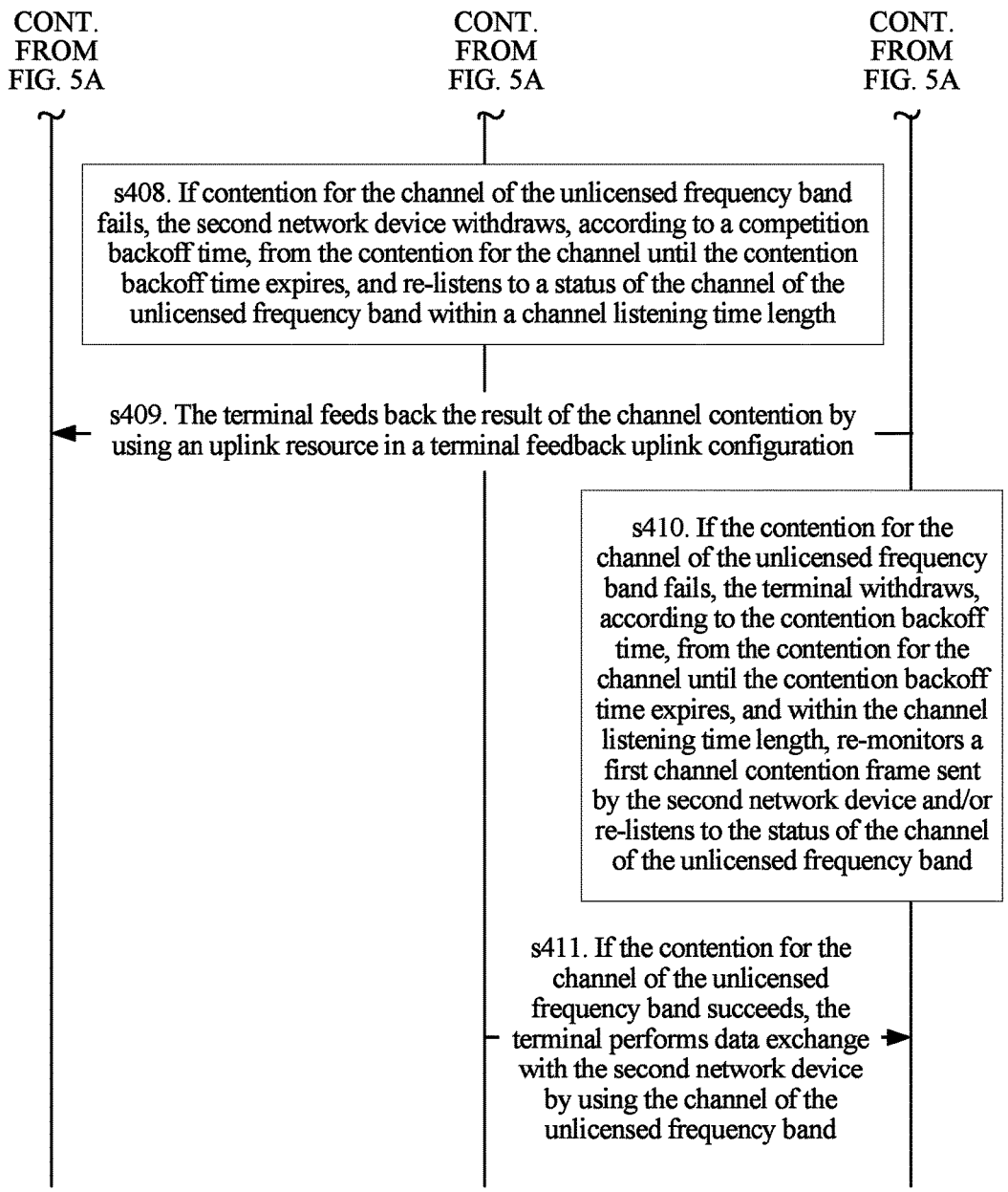

FIG. 5A and FIG. 5B are a flowchart of Embodiment 4 of a method for contending for a channel of an unlicensed frequency band according to the present invention. As shown in FIG. 5A and FIG. 5B, the method in this embodiment may include the following steps:

s401. A first network device configures contention timeslot configuration information.

In this embodiment, the contention timeslot configuration information is configured by a primary serving cell or a master eNodeB.

s402. The first network device sends the contention timeslot configuration information to a terminal.

In this embodiment, the first network device sends the configured contention timeslot configuration information to the terminal, where the contention timeslot configuration information includes at least one of the following configurations: a time configuration of the contention timeslot, a contention backoff time, a terminal feedback uplink configuration, or a channel available condition. The first network device may send the contention timeslot configuration information to the terminal by using an RRC specific message, or by using a system message.

s403. A second network device acquires, according to the contention timeslot configuration information, a condition for starting a contention timeslot.

In this embodiment, a process in which a second network device acquires, according to the contention timeslot configuration information, a condition for starting a contention timeslot is similar to step 201 in the foregoing method embodiment, and details are not described herein again.

s404. The second network device performs a corresponding operation within the contention timeslot according to a time configuration of the contention timeslot to contend for a channel of an unlicensed frequency band.

In this embodiment, a process in which the second network device performs a corresponding operation within the contention timeslot according to the time configuration of the contention timeslot to contend for a channel of an unlicensed frequency band is similar to step 202 in the foregoing method embodiment, and details are not described herein again.

s405. The terminal acquires, according to the contention timeslot configuration information, the condition for starting the contention timeslot.

In this embodiment, a process in which the terminal acquires, according to the contention timeslot configuration information, a condition for starting a contention timeslot is similar to step 302 in the foregoing method embodiment. It should be noted that if that the second network device and the terminal periodically start the contention timeslot is configured on the first network device, the second network device and the terminal may start the contention timeslot at the same time. In addition, the first network device does not schedule the terminal in this timeslot.

s406. The terminal performs the corresponding operation within the contention timeslot according to the time configuration of the contention timeslot to contend for the channel of the unlicensed frequency band.

In this embodiment, a process in which the terminal performs a corresponding operation within the contention timeslot according to the time configuration of the contention timeslot to contend for a channel of an unlicensed frequency band is similar to step 303 in the foregoing method embodiment, and details are not described herein again.

s407. The second network device notifies the terminal of a channel contention result.

In this embodiment, a process in which the second network device notifies the terminal of a channel contention result is similar to step 203 in the foregoing method embodiment, and details are not described herein again.

s408. If contention for the channel of the unlicensed frequency band fails, the second network device withdraws, according to a contention backoff time, from the contention for the channel until the contention backoff time expires, and re-listens to a status of the channel of the unlicensed frequency band within a channel listening time length.

In this embodiment, a process in which if contention for the channel of the unlicensed frequency band fails, the second network device withdraws, according to the contention backoff time, from the contention for the channel until the contention backoff time expires, and re-listens to a status of the channel of the unlicensed frequency band within a channel listening time length is similar to step 204 in the foregoing method embodiment, and details are not described herein again.

s409. The terminal feeds back the channel contention result by using an uplink resource in a terminal feedback uplink configuration.

In this embodiment, a process in which the terminal feeds back the channel contention result by using an uplink resource in the terminal feedback uplink configuration is similar to step 304 in the foregoing method embodiment, and details are not described herein again.

s410. If the contention for the channel of the unlicensed frequency band fails, the terminal withdraws, according to the contention backoff time, from the contention for the channel until the contention backoff time expires, and within the channel listening time length, re-monitors a first channel contention frame sent by the second network device and/or re-listens to the status of the channel of the unlicensed frequency band.

In this embodiment, a process in which if contention for the channel of the unlicensed frequency band fails, the terminal withdraws, according to the contention backoff time, from the contention for the channel until the contention backoff time expires, and within the channel listening time length, re-monitors a first channel contention frame sent by the second network device and/or re-listens to the status of the channel of the unlicensed frequency band is similar to step 306 in the foregoing method embodiment, and details are not described herein again.

s411. If the contention for the channel of the unlicensed frequency band succeeds, the terminal performs data exchange with the second network device by using the channel of the unlicensed frequency band.

In this embodiment, a process in which if the contention for the channel of the unlicensed frequency band succeeds, the terminal performs data exchange with the second network device by using the channel of the unlicensed frequency band is similar to step 305 in the foregoing method embodiment, and details are not described herein again.

In this embodiment, a second network device and a terminal enter a contention timeslot according to contention timeslot configuration information, and perform a corresponding operation within the contention timeslot according to a time configuration of the contention timeslot to contend for a channel of an unlicensed frequency band, so as to implement data transmission in an LTE carrier aggregation technology by using the unlicensed frequency band, so that an LTE user and another RAT user fairly and properly use unlicensed spectrum resources, and a mutual interference problem is resolved.

Figure 6:
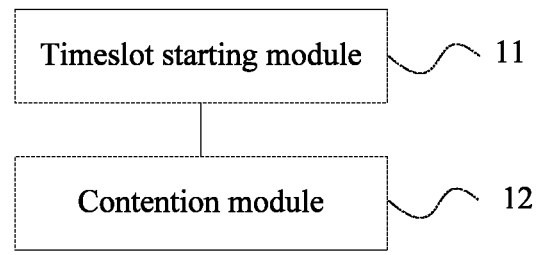
FIG. 6 is a schematic structural diagram of Embodiment 1 of a second network device according to the present invention.

FIG. 6 is a schematic structural diagram of Embodiment 1 of a second network device according to the present invention. As shown in FIG. 6, an apparatus in this embodiment may include: a timeslot starting module 11 and a contention module 12, where the timeslot starting module 11 is configured to acquire, according to contention timeslot configuration information, a condition for starting a contention timeslot, and start the contention timeslot when the condition is met, where the contention timeslot configuration information includes at least one of the following configurations: a time configuration of the contention timeslot, a contention backoff time, a terminal feedback uplink configuration, or a channel available condition; and the contention module 12 is configured to perform a corresponding operation within the contention timeslot according to the time configuration of the contention timeslot to contend for a channel of an unlicensed frequency band, so as to implement data transmission on the unlicensed frequency band, where the time configuration of the contention timeslot includes an idle time length, a channel listening time length, or a channel preemption time length.

The apparatus in this embodiment may be configured to execute the technical solutions of the method embodiment shown in FIG. 1, and an implementation principle and a technical effect of the technical solutions are similar and are not described herein again.

Figure 7:
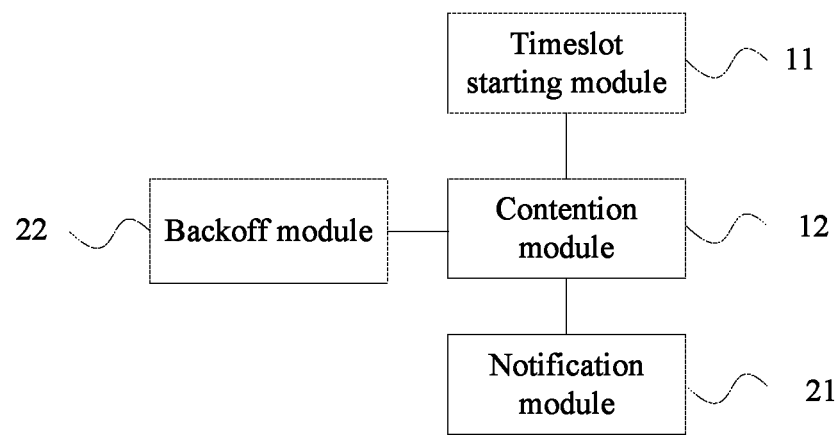
FIG. 7 is a schematic structural diagram of Embodiment 2 of a second network device according to the present invention.

FIG. 7 is a schematic structural diagram of Embodiment 2 of a second network device according to the present invention. As shown in FIG. 7, on the basis of the apparatus structure shown in FIG. 6, an apparatus in this embodiment may further include: a notification module 21 and a backoff module 22, where the notification module 21 is configured to notify a terminal of a channel contention result; and the backoff module 22 is configured to: if contention for the channel of the unlicensed frequency band fails, withdraw, according to the contention backoff time, from the contention for the channel until the contention backoff time expires, and re-listen to a status of the channel of the unlicensed frequency band within the channel listening time length.

Further, the contention module 12 is specifically configured to: remain, beginning from a moment of starting the contention timeslot, an idle state within the idle time length, then listen to a status of the channel of the unlicensed frequency band within the channel listening time length, determine, according to the channel available condition, whether the channel of the unlicensed frequency band is available, and send a first channel contention frame if the channel of the unlicensed frequency band is available, where the first channel contention frame carries the channel preemption time length.

Further, if the contention timeslot configuration information further includes: a starting period and subframe offset that are of the contention timeslot, the timeslot starting module 11 is specifically configured to compute and acquire, according to the starting period and the subframe offset that are of the contention timeslot, the moment of starting the contention timeslot, and start the contention timeslot at the moment; and if the contention timeslot configuration information further includes a starting trigger condition of the contention timeslot, the timeslot starting module 11 is specifically configured to monitor an uplink channel and/or a downlink channel according to the starting trigger condition of the contention timeslot, and start the contention timeslot when an event meeting the starting trigger condition is generated.

The apparatus in this embodiment may be configured to execute the technical solutions of the method embodiment shown in FIG. 1 or FIG. 3, and an implementation principle and a technical effect of the technical solutions are similar and are not described herein again.

Figure 8:
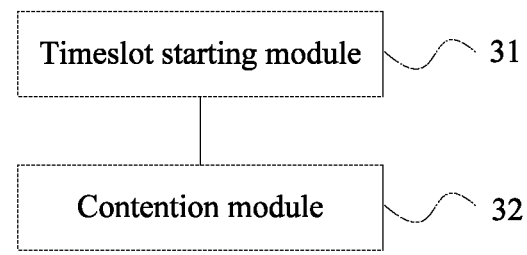
FIG. 8 is a schematic structural diagram of Embodiment 1 of a terminal according to the present invention.

FIG. 8 is a schematic structural diagram of Embodiment 1 of a terminal according to the present invention. As shown in FIG. 8, an apparatus in this embodiment may include: a timeslot starting module 31 and a contention module 32, where the timeslot starting module 31 is configured to acquire, according to contention timeslot configuration information, a condition for starting a contention timeslot, and start the contention timeslot when the condition is met, where the contention timeslot configuration information includes at least one of the following configurations: a time configuration of the contention timeslot, a contention backoff time, a terminal feedback uplink configuration, or a channel available condition; and the contention module 32 is configured to perform a corresponding operation within the contention timeslot according to the time configuration of the contention timeslot to contend for a channel of an unlicensed frequency band, so as to implement data transmission on the unlicensed frequency band, where the time configuration of the contention timeslot includes an idle time length, a channel listening time length, or a channel preemption time length.

The apparatus in this embodiment may be configured to execute the technical solutions of the method embodiment shown in FIG. 1, and an implementation principle and a technical effect of the technical solutions are similar and are not described herein again.

Figure 9:
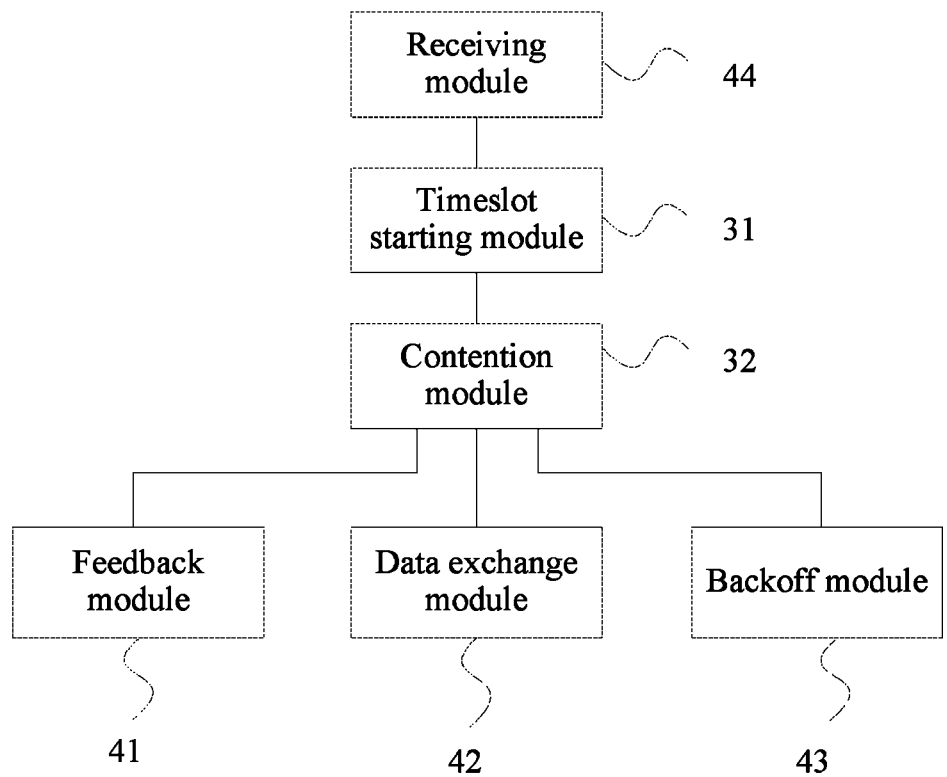
FIG. 9 is a schematic structural diagram of Embodiment 2 of a terminal according to the present invention.

FIG. 9 is a schematic structural diagram of Embodiment 2 of a terminal according to the present invention. As shown in FIG. 9, on the basis of the apparatus structure shown in FIG. 8, an apparatus in this embodiment may further include: a feedback module 41, a data exchange module 42, a backoff module 43, and a receiving module 44, where the feedback module 41 is configured to feed back a channel contention result by using an uplink resource in the terminal feedback uplink configuration; the data exchange module 42 is configured to: if contention for the channel of the unlicensed frequency band succeeds, perform data exchange with a second network device by using the channel of the unlicensed frequency band; the backoff module 43 is configured to: if the contention for the channel of the unlicensed frequency band fails, withdraw, according to the contention backoff time, from the contention for the channel until the contention backoff time expires, and within the channel listening time length, re-monitor a first channel contention frame sent by the second network device and/or re-listen to a status of the channel of the unlicensed frequency band; and the receiving module 44 is configured to receive contention timeslot configuration information sent by a first network device.

Further, the contention module 32 is specifically configured to: remain, beginning from a moment of starting the contention timeslot, an idle state within the idle time length, then within the channel listening time length, monitor a first channel contention frame sent by a second network device and/or listen to a status of the channel of the unlicensed frequency band, and send a second channel contention frame if the first channel contention frame is received and/or the channel of the unlicensed frequency band is available, where the second channel contention frame carries the channel preemption time length.

Further, if the contention timeslot configuration information further includes: a starting period and subframe offset that are of the contention timeslot, and a sequence in which the terminal preempts the channel, the timeslot starting module 31 is specifically configured to compute and acquire, according to the starting period and the subframe offset that are of the contention timeslot, the moment of starting the contention timeslot, and start the contention timeslot at the moment; and the contention module 32 is specifically configured to remain, beginning from the moment of starting the contention timeslot, the idle state within the idle time length, then within the channel listening time length, monitor the first channel contention frame sent by the second network device and/or sense the status of the channel of the unlicensed frequency band, and if the first channel contention frame is received and/or the channel of the unlicensed frequency band is available, send the second channel contention frame according to the sequence in which the terminal preempts the channel, where the second channel contention frame carries the channel preemption time length. If the contention timeslot configuration information further includes a starting trigger condition of the contention timeslot, the timeslot starting module 31 is specifically configured to monitor an uplink channel and/or a downlink channel according to the starting trigger condition of the contention timeslot, and start the contention timeslot when an event meeting the starting trigger condition is generated.

The apparatus in this embodiment may be configured to execute the technical solutions of the method embodiment shown in FIG. 1 or FIG. 4, and an implementation principle and a technical effect of the technical solutions are similar and are not described herein again.

Figure 10:
FIG. 10 is a schematic structural diagram of Embodiment 3 of a second network device according to the present invention.

FIG. 10 is a schematic structural diagram of Embodiment 3 of a second network device according to the present invention. As shown in FIG. 10, the device in this embodiment may include: a processor 11, configured to: acquire, according to contention timeslot configuration information, a condition for starting a contention timeslot, and start the contention timeslot when the condition is met, where the contention timeslot configuration information includes at least one of the following configurations: a time configuration of the contention timeslot, a contention backoff time, a terminal feedback uplink configuration, or a channel available condition; and perform a corresponding operation within the contention timeslot according to the time configuration of the contention timeslot to contend for a channel of an unlicensed frequency band, so as to implement data transmission on the unlicensed frequency band, where the time configuration of the contention timeslot includes an idle time length, a channel listening time length, or a channel preemption time length.

The device in this embodiment may be configured to execute the technical solutions of the method embodiment shown in FIG. 1, and an implementation principle and a technical effect of the technical solutions are similar and are not described herein again.

Figure 11:
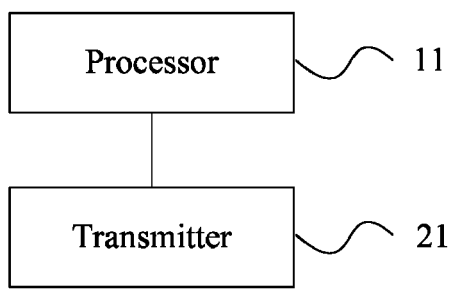
FIG. 11 is a schematic structural diagram of Embodiment 4 of a second network device according to the present invention.

FIG. 11 is a schematic structural diagram of Embodiment 4 of a second network device according to the present invention. As shown in FIG. 11, on the basis of the device structure shown in FIG. 10, the device in this embodiment may further include a transmitter 21. The processor 11 is specifically configured to remain, beginning from a moment of starting the contention timeslot, an idle state within the idle time length, then listen to a status of the channel of the unlicensed frequency band within the channel listening time length, and determine, according to the channel available condition, whether the channel of the unlicensed frequency band is available. The transmitter 21 is configured to send a first channel contention frame if the channel of the unlicensed frequency band is available, where the first channel contention frame carries the channel preemption time length.

Further, the processor 11 is specifically configured to: compute and acquire, according to a starting period and subframe offset that are of the contention timeslot, the moment of starting the contention timeslot, and start the contention timeslot at the moment; or specifically configured to monitor an uplink channel and/or a downlink channel according to a starting trigger condition of the contention timeslot, and start the contention timeslot when an event meeting the starting trigger condition is generated. The processor 11 is further configured to: notify a terminal of a channel contention result; and if contention for the channel of the unlicensed frequency band fails, withdraw, according to the contention backoff time, from the contention for the channel until the contention backoff time expires, and re-sense the status of the channel of the unlicensed frequency band within the channel listening time length.

The device in this embodiment may be configured to execute the technical solutions of the method embodiment shown in FIG. 1 or FIG. 3, and an implementation principle and a technical effect of the technical solutions are similar and are not described herein again.

Figure 12:
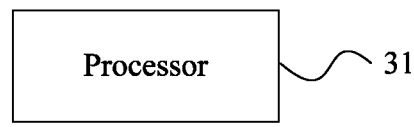
FIG. 12 is a schematic structural diagram of Embodiment 3 of a terminal according to the present invention.

FIG. 12 is a schematic structural diagram of Embodiment 3 of a terminal according to the present invention. As shown in FIG. 12, a device in this embodiment may include: a processor 31, configured to: acquire, according to contention timeslot configuration information, a condition for starting a contention timeslot, and start the contention timeslot when the condition is met, where the contention timeslot configuration information includes at least one of the following configurations: a time configuration of the contention timeslot, a contention backoff time, a terminal feedback uplink configuration, or a channel available condition; and perform a corresponding operation within the contention timeslot according to the time configuration of the contention timeslot to contend for a channel of an unlicensed frequency band, so as to implement data transmission on the unlicensed frequency band, where the time configuration of the contention timeslot includes an idle time length, a channel listening time length, or a channel preemption time length.

The device in this embodiment may be configured to execute the technical solutions of the method embodiment shown in FIG. 1, and an implementation principle and a technical effect of the technical solutions are similar and are not described herein again.

Figure 13:
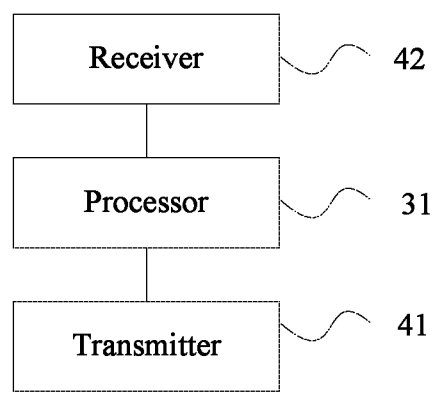
FIG. 13 is a schematic structural diagram of Embodiment 4 of a terminal according to the present invention.

FIG. 13 is a schematic structural diagram of Embodiment 4 of a terminal according to the present invention. As shown in FIG. 13, on the basis of the device structure shown in FIG. 12, a device in this embodiment may further include: a transmitter 41 and a receiver 42. The processor 31 is specifically configured to remain, beginning from a moment of starting the contention timeslot, an idle state within the idle time length, then within the channel listening time length, monitor a first channel contention frame sent by a second network device and/or listen to a status of the channel of the unlicensed frequency band; and the transmitter 41 is configured to send a second channel contention frame if the first channel contention frame is received and/or the channel of the unlicensed frequency band is available, where the second channel contention frame carries the channel preemption time length.

Further, the processor 31 is specifically configured to compute and acquire, according to a starting period and subframe offset that are of the contention timeslot, the moment of starting the contention timeslot, and start the contention timeslot at the moment; and the transmitter 41 is specifically configured to: if the first channel contention frame is received and/or the channel of the unlicensed frequency band is available, send the second channel contention frame according to a sequence in which the terminal preempts the channel, where the second channel contention frame carries the channel preemption time length. The processor 11 is further configured to monitor an uplink channel and/or a downlink channel according to the starting trigger condition of the contention timeslot, and start the contention timeslot when an event meeting the starting trigger condition is generated.

Further, the transmitter 41 is further configured to feed back a channel contention result by using an uplink resource in the terminal feedback uplink configuration; and further configured to: if contention for the channel of the unlicensed frequency band succeeds, send data to the second network device by using the channel of the unlicensed frequency band. The processor 31 is further configured to: if the contention for the channel of the unlicensed frequency band fails, withdraw, according to the contention backoff time, from the contention for the channel until the contention backoff time expires, and within the channel listening time length, re-monitor the first channel contention frame sent by the second network device and/or re-sense the status of the channel of the unlicensed frequency band. The receiver 42 is configured to: if the contention for the channel of the unlicensed frequency band succeeds, receive, by using the channel of the unlicensed frequency band, data sent by the second network device; and receive contention timeslot configuration information sent by a first network device.

The device in this embodiment may be configured to execute the technical solutions of the method embodiment shown in FIG. 1 or FIG. 4, and an implementation principle and a technical effect of the technical solutions are similar and are not described herein again.

Figure 14:
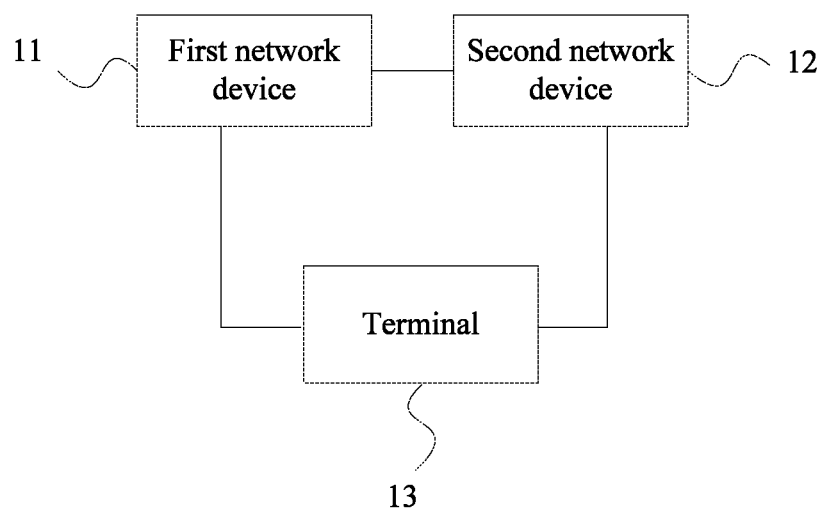
FIG. 14 is a schematic structural diagram of an embodiment of a system for contending for a channel of an unlicensed frequency band according to the present invention.

FIG. 14 is a schematic structural diagram of an embodiment of a system for contending for a channel of an unlicensed frequency band according to the present invention. As shown in FIG. 14, the system in this embodiment includes: a first network device 11, a second network device 12, and a terminal 13, where the first network device 11 and the second network device 12 support carrier aggregation, the first network device 11 uses a spectrum resource of a licensed frequency band, the second network device 12 uses a spectrum resource of an unlicensed frequency band, the first network device 11 is a primary network device, and the second network device 12 is a secondary network device of the first network device 11. The second network device 12 may use a structure in the device embodiment in FIG. 6 or FIG. 7, and correspondingly, may execute the technical solutions of the method embodiment in FIG. 1 or FIG. 3, and an implementation principle and a technical effect of the technical solutions are similar and are not described herein again. The terminal 13 may use a structure in the device embodiment in FIG. 8 or FIG. 9, and correspondingly, may execute the technical solutions of the method embodiment in FIG. 1 or FIG. 4, and an implementation principle and a technical effect of the technical solutions are similar and are not described herein again.

Further, the structural diagram of the system shown in FIG. 14 may also indicate a schematic structural diagram of a device system, where the first network device 11 and the second network device 12 support carrier aggregation, the first network device 11 uses a spectrum resource of a licensed frequency band, the second network device 12 uses a spectrum resource of an unlicensed frequency band, the first network device 11 is a primary network device, and the second network device 12 is a secondary network device of the first network device 11. The second network device 12 may use a structure in the device embodiment in FIG. 10 or FIG. 11, and correspondingly, may execute the technical solutions of the method embodiment in FIG. 1 or FIG. 3, and an implementation principle and a technical effect of the technical solutions are similar and are not described herein again. The terminal 13 may use a structure in the device embodiment in FIG. 12 or FIG. 13, and correspondingly, may execute the technical solutions of the method embodiment in FIG. 1 or FIG. 4, and an implementation principle and a technical effect of the technical solutions are similar and are not described herein again.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by persons skilled in the art that, for the purpose of convenient and brief description, division of the foregoing function modules is used as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for contending for a channel of an unlicensed frequency band, comprising:
    acquiring, according to contention timeslot configuration information, a condition for starting a contention timeslot, and starting the contention timeslot when the condition is met, wherein the contention timeslot configuration information comprises a time configuration of the contention timeslot; and
    performing a corresponding operation within the contention timeslot according to the time configuration of the contention timeslot to contend for the channel of the unlicensed frequency band, so as to implement data transmission on the unlicensed frequency band, wherein the time configuration of the contention timeslot comprises an idle time length,
    wherein
        when the method is executed by a second network device, the performing a corresponding operation within the contention timeslot according to the time configuration of the contention timeslot to contend for the channel of the unlicensed frequency band comprises:
        remaining, beginning from a moment of starting the contention timeslot, an idle state within the idle time length;
    wherein the contention timeslot configuration information further comprises:
        a starting period and subframe offset that are of the contention timeslot; and
        the acquiring, according to contention timeslot configuration information, a condition for starting a contention timeslot, and starting the contention timeslot when the condition is met comprises:
        computing and acquiring, according to the starting period and the subframe offset that are of the contention timeslot, the moment of starting the contention timeslot, and starting the contention timeslot at the moment, or
    wherein the contention timeslot configuration information further comprises: a starting trigger condition of the contention timeslot; and
    the acquiring, according to contention timeslot configuration information, a condition for starting a contention timeslot, and starting the contention timeslot when the condition is met comprises:
    monitoring an uplink channel and/or a downlink channel according to the starting trigger condition of the contention timeslot, and starting the contention timeslot when an event meeting the starting trigger condition is generated.

2. The method according to claim 1, after the performing a corresponding operation within the contention timeslot according to the time configuration of the contention timeslot to contend for the channel of the unlicensed frequency band, further comprising:
    if contention for the channel of the unlicensed frequency band fails, withdrawing, according to the contention backoff time, from the contention for the channel until the contention backoff time expires, and re-listening to the status of the channel of the unlicensed frequency band within the channel listening time length.

3. A non-transitory computer readable storage medium storing program code for use by a terminal in a communication network, the program code comprising instructions for executing a method that comprises:
    acquiring, according to contention timeslot configuration information, a condition for starting a contention timeslot, and start the contention timeslot when the condition is met, wherein the contention timeslot configuration information comprises a time configuration of the contention timeslot;
    performing a corresponding operation within the contention timeslot according to the time configuration of the contention timeslot to contend for a channel of an unlicensed frequency band, so as to implement data transmission on the unlicensed frequency band, wherein the time configuration of the contention timeslot comprises an idle time length;
    remaining, beginning from a moment of starting the contention timeslot, in an idle state within the idle time length;
    wherein the contention timeslot configuration information further comprises: a starting period and subframe offset that are of the contention timeslot; and
    the program code further comprises instructions for executing a method that comprises:
        computing and acquiring, according to the starting period and the subframe offset that are of the contention timeslot, the moment of starting the contention timeslot, and start the contention timeslot at the moment, or
    wherein the contention timeslot configuration information further comprises: a starting period and subframe offset that are of the contention timeslot; and
    the program code further comprises instructions for executing a method that comprises:
        computing and acquiring, according to the starting period and the subframe offset that are of the contention timeslot, the moment of starting the contention timeslot, and start the contention timeslot at the moment.

4. The non-transitory computer readable storage medium according to claim 3, wherein after the performing a corresponding operation within the contention timeslot according to the time configuration of the contention timeslot to contend for the channel of the unlicensed frequency band, further comprising:
    if contention for the channel of the unlicensed frequency band fails, withdrawing, according to the contention backoff time, from the contention for the channel until the contention backoff time expires, and re-listening to the status of the channel of the unlicensed frequency band within the channel listening time length.

* * * * *